Sept. 8, 1959     T. F. STACY     2,902,923
SCREW PRESS
Filed Oct. 7, 1958     2 Sheets-Sheet 1
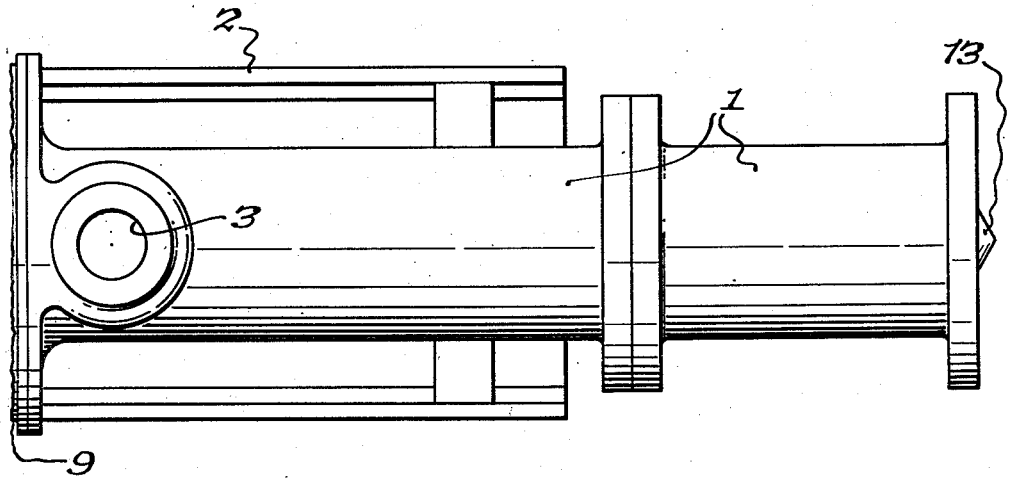
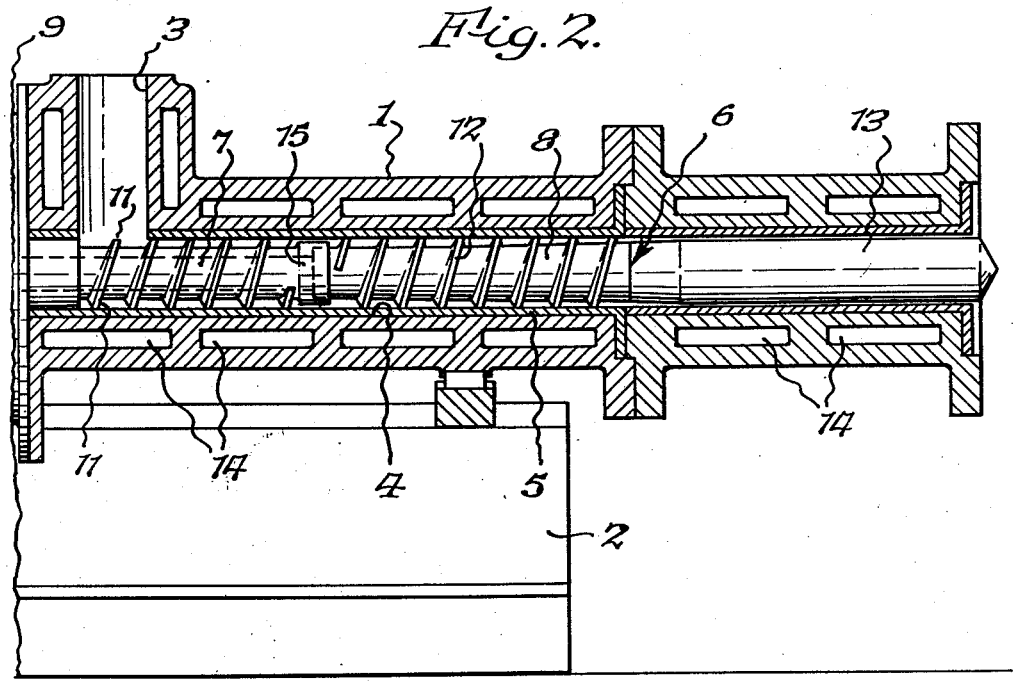
INVENTOR.
Thomas F. Stacy
BY
Parker & Buchman
Attorneys.

INVENTOR.
Thomas F. Stacy
BY
Carker & Crochmon.
Attorneys.

United States Patent Office 2,902,923
Patented Sept. 8, 1959

2,902,923
SCREW PRESS

Thomas F. Stacy, Piqua, Ohio, assignor to The French Oil Mill Machinery Company, Piqua, Ohio Application October 7, 1958, Serial No. 765,826

9 Claims. (Cl. 100—145)

This invention relates to mechanical screw presses for advancing and compressing loose solids particles and delivering them in compressed or extruded form. Presses of this type are known in which the advancing is caused by two worm shafts disposed in a passage in a casing between an inlet and an outlet, in tandem and abutting end to end. The shaft sections have flights on their peripheral surfaces which receive and advance the particles under pressure. The shafts rotate at different speeds and have different flights. The flight on the first shaft that receives particles from the casing inlet advances a relatively large volume of the particles under a relatively low pressure to the flight on the second section, and the latter advances the received particles under a higher pressure to the outlet of the casing for discharge. A machine of this type for use in extracting liquids from the particles containing the same is shown, for example, in U.S. Patent No. 1,421,282 to Meakin, issued on June 27, 1922. Such presses are also useful for extrusion of such material as rubber and various plastic materials in which use the casing has no outlets along the passage for delivery of liquids, the delivery outlet is formed to extrude the compressed and somewhat fluid material in the desired shape and size. The particles are heated to an extrusion condition during their travel along the passage of the casing.

One problem in screw presses is that where the shaft sections meet end to end the material being advanced, to some extent, has a tendency to extrude or pass between the abutting ends of the shaft sections. If the material is rubber or a plastic and does extrude into the space between the abutting shaft ends, it may burn and cause gas, and with certain types of plastic materials it can cause their rapid disintegration.

An object of this invention is to provide an improved and relatively simple mechanical screw press which is useful for either liquid extraction or for extrusion of materials, such as rubber and plastic materials, for example, in tubular or other shapes, with which entry of the materials being handled into the space between abutting ends of the shaft sections is substantially eliminated or greatly restricted, which is easily incorporated at low cost in existing types of presses with a minimum of change, and which will be relatively simple, practical, compact, effective and inexpensive.

Other objects and advantages will be apparent from the following description of some examples of the invention and the novel features will be particularly pointed out hereinafter in connection with the appended claims.

In the accompanying drawings:

Fig. 1 is a plan of the screw end of a press constructed in accordance with one example of the invention;

Fig. 2 is a longitudinal, sectional elevation of the same with the casing in section and the screw shaft sections in elevation;

Figure 3:
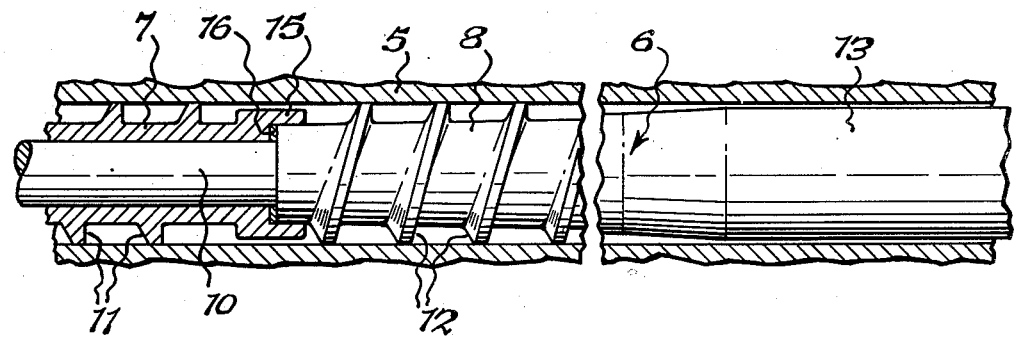
Fig. 3 is a view of part of the same similar to that of Fig. 2 but with the first shaft section in sectional elevation.

Referring first to the embodiment of the invention illustrated in Figs. 1 to 3, the improvement is in the joint between the abutting ends of the two screw shaft sections. A tubular casing 1 is suitably supported on a base 2 to extend in a horizontal direction. The casing has an upright inlet passage 3 adjacent one end of the casing by which loose solids particles to be compressed are introduced, and also has a horizontal passage 4 lined by a hardened sleeve 5 that has an aperture opening into the lower end of passage 3. An advancing element 6 is rotatably mounted in and fits the sleeve 5 and is formed of two shaft sections 7 and 8 which are arranged in tandem and abutting end to end. The shaft section 7 extends through the end of the casing at the end having the passage 3, into a housing 9 in which is provided power means (not shown) by which the shaft 7 is rotated about its axis and held against endwise movement.

The shaft section 8, at the end abutting an end of the shaft section 7 has a reduced, concentric extension 10 that extends longitudinally through the section 7 and into the housing 9 and there, by means not shown, it is rotated by said power means at a rate which is different from that at which the shaft section 7 is rotated. The extension 10 may have a bearing in the section 7, and also both sections 7 and 8 have substantial thrust and radial bearings in the housing, by which the shaft sections are both fully rotatably supported. The means in the housing for supporting the shaft sections and rotating them at different speeds is not illustrated because this invention is not directed to that means, and operable means for that purpose is illustrated in said Meakin Patent No. 1,421,282, to which reference is made as a part of this disclosure, if information is desired as to such means.

The first shaft section 7 on its peripheral surface carries a helical fin or flight 11 fixed therein for rotation therewith, and this fin acts as an advancing screw running closely along the liner 5 for receiving the loose solids particles from the inlet passage 3 and propelling them along the liner 5 and discharging them at about the abutting ends between the shaft sections. The shaft section 8 also has fixed on its peripheral surface a helical fin or flight 12 that runs along and closely with the passage wall of the liner for an axial distance about equal to the axial length of the fin 11, and serves to receive the solids delivered to one end of it by the flight 11 and propel them farther along the passage of liner 5. The shaft section with its helical flight 11 is rotated at one speed by the power means (not shown) in the housing 9, and propels a relatively large volume of such particles at a relatively low pressure.

The other shaft section with its flight 12 is rotated at a different speed than section 7, and with its different flight it propels the received particles along at a relatively high pressure. The section 8 has a large extension or core 13 on its outer end but within the liner 5 which rotates with it, has a close clearance between its periphery and the passage of the liner 5, and terminates at about the delivery end of the liner 5, as shown in Fig. 2. This close clearance between the core 13 and the liner 5 creates friction that is necessary to have a compression of the particles being advanced by the flight 12.

When the press is used to extract liquids from the solids particles the bottom part of the liner and the casing have drainage apertures (not shown) in a row lengthwise of the casing for the release of expressed liquid, but when the press is used to extrude plastics, for example, there are no such drainage openings and the plastic particles are formed into a tubular, selected shape and of a selected size, determined by the shape and size of the delivery opening at the delivery end of the casing, as usual in extrusion presses. The casing has jacket chambers or spaces 14 through which, when the press is used to express liquids, a cooling liquid or fluid medium may be circulated to prevent heating of the particles to too high a temperature during the compression of the particles and extraction of liquid. When used to extrude plastics, a heating fluid may be circulated through the jacket spaces 14 to heat the particles in transit and render them fluid so that they can be extruded as a tubular solid.

Some of the plastic materials under the compression become quite fluid at about the time the particles reach the abutting ends of the sections 7 and 8, and since such fluid is under pressure, it tends to work between or be extruded between the abutting ends, where it may burn and cause gas. With certain types of plastics this can cause their rapid disintegration. When the press is used to extract liquids, some of the fine particles tend to work between the abutting ends of the shaft sections and cause trouble.

To prevent this movement of some of the particles or plastic between the abutting ends of the shaft sections, the delivery end of the first section 7 has a collar 15 attached thereto and rotatable therewith, and this collar telescopes somewhat over the adjacent abutting end of the other shaft section 8, as shown in Fig. 3. Since the periphery of this collar runs closer to the liner 5 than the section 7 beyond the end of flight 11, this provides a restriction in the passage of the liner between the sections through which the particles or materials being forwarded must pass. Hence the pressure on the particles at the free end of the collar will be less than it is at the anchored end of the collar. The screw flight 12 of the section 8 would pick up this material at the momentarily lower pressure and advance it under high pressure.

This momentary decrease in pressure reduces the tendency of the material under advancement to work between the abutting end press of the shaft sections. A thrust washer 16 (Fig. 3) may be interposed between the abutting end faces of the shaft sections on the extension 10 to take up some of the wear due to the different speeds at which the shaft sections are rotated, and the end thrust of the section 8.

Figure 4:
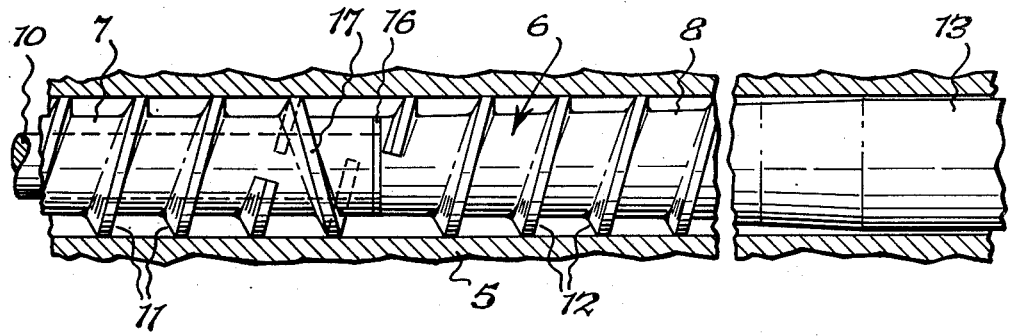
Fig. 4 is a longitudinal, sectional elevation through a part of the casing with the screw shaft sections in elevation and illustrating a modification of the invention.
Figure 5:
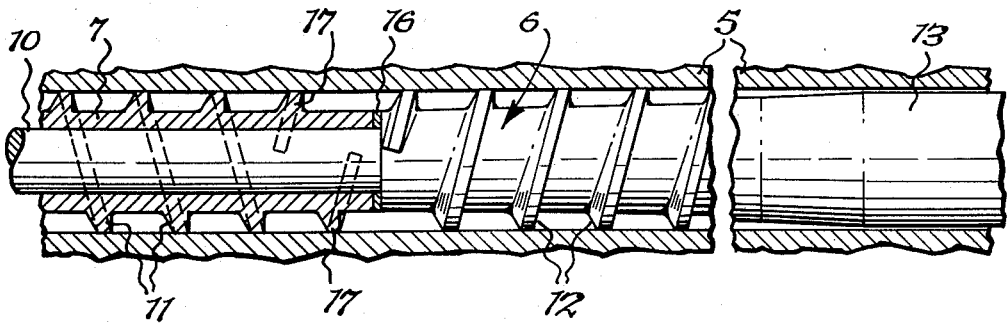
Fig. 5 is a view similar to Fig. 4 but with the first shaft section in sectional elevation.

In the embodiment of the invention shown in Figs. 4 and 5, where parts corresponding to similar parts in Figs. 1–3 have similar reference numerals, instead of the collar on the delivery end of the first shaft section 7, that delivery end is provided with a short helical fin or flight 17 that is a reverse flight, in that it opposes advancement of the materials along the screw section 7 at the delivery end. This flight 17 is disconnected from flight 11, in that there is a gap between them, and merely tends to create a back pressure on the advancing particles or materials approaching the delivered end of the section 7. Thus back pressure is momentarily decreased as the particles reach the abutting ends of the sections where they are picked up by the flight 12 and advanced farther under higher pressure. This momentary decrease in pressure on the materials or particles as they pass the abutting ends of the shaft sections reduces their tendency to work between the abutting ends of the sections. A thrust washer 16 may also be provided between the shaft sections 7 and 8 (Figs. 4 and 5).

It will be observed that with both embodiments of the invention, the pressure on the particles or materials being compressed and advanced is momentarily reduced as they pass the abutting ends of the shaft sections 7 and 8 to minimize the tendency of such particles or materials to feed or work between the abutting ends. This effect is obtained whether compressing the particles or materials to extract liquids therefrom as in extraction presses, or to extrude them as a plastic or other body at the discharge end of the press.

It will be understood that various changes in the details, materials, arrangements and construction of parts which have been herein described and illustrated in order to explain the nature of the invention may be made by those skilled in the art within the principle and scope of the invention as expressed in the appended claims.

I claim:

1. In a mechanical screw press of the type in which loose solids particles are compressed and advanced along the passage of a casing, such as for expressing liquids from the compressed particles or when heated during their advancement extruding the compressed particles as a body of a desired shape, and in which the compression is by worm shaft sections disposed in said passage, arranged in tandem and having screw flights of selected pitches on their peripheral surfaces running in close proximity to the passage wall, with said shafts rotatable at different speeds and said flight on the first shaft section advancing a relatively large volume of said particles at a relatively low pressure to the second shaft section and the latter advancing the received particles at a relatively high pressure to the delivery end for discharge from the passage, that improvement therein which comprises said casing, said shaft sections in the passage of said casing, and means in said passage on the peripheral surface of said first shaft section, adjacent the junction between the abutting end sections, and cooperating with the passage wall of the casing for momentarily decreasing the pressure of the screw flight of the first section on the particles advanced by the flight on the first section past the junction between the exposed abutting peripheral surfaces of the shaft sections to the flight on the second shaft section.

2. The screw press as set forth in claim 1, wherein the said means is a collar on the terminal discharge end of the first section which telescopes over and fits the periphery of the receiving end of the second section, and by running in close proximity to the second passage wall encircling it forming an annular restriction passage through which the particles pass in their travel to the second section with lower pressure on the particles as they leave the collar and are picked up by the flight on the second section to lessen their tendency to flow between the abutting section surfaces.

3. The screw press as set forth in claim 1, wherein said means is a collar on the discharge end of the first section that cooperates with the passage wall encircling it to form a restricted annular passage through which must pass the particles advanced by the advancing flight on the first section in reaching the second shaft section, for creating a reduced pressure momentary on the advancing particles as they pass the abutting exposed surfaces of the shaft sections and are picked up by the flight on the second section.

4. The screw press as set forth in claim 1, wherein said means is a short reverse flight on the periphery of the discharge end portion of the first shaft section that builds up a back pressure on the particles and thus creates a drop in pressure on the particles leaving the reverse flight to pass to the second sections and be picked up by the flight on the second shaft section.

5. The screw press as set forth in claim 1 and a thrust washer between the abutting end faces of the two shaft sections.

6. A mechanical screw press comprising a casing having a passage with an inlet and an outlet, two separate shaft sections in said passage arranged in tandem and abutting end to end, and each having a flight in its peripheral surface for advancing loose solids particles along said passage under pressure from its said inlet to its said outlet, the flight on the first shaft section operating to advance a relatively large volume of loose solids particles under a relatively low pressure to the second section, and the flight on the second section being operable for advancing the particles received from the first section along said passage at a relatively higher pressure to the discharge outlet, and means on the first section at the delivery end of its advancing flight, adjacent the said abutting ends of the shaft sections, and cooperating with the wall of said passage of said casing for momentarily decreasing the pressure on said particles as they pass said abutting ends between said sections, and thus reducing any tendency of the particles to flow between the abutting ends of the sections instead of along the passage from shaft section to shaft section.

7. The press as set forth in claim 6, wherein said means is a collar on the periphery of the delivery end of the first shaft section.

8. The press as set forth in claim 6, wherein said means is a short reverse acting flight on the periphery of the delivery end of the first shaft section that builds up a back pressure on the said particles reaching the delivery end of the first shaft section and thus creates a momentary decrease in pressure on the particles passing the abutting ends of the shaft sections before being picked up and advanced by the flight on the second shaft section.

9. The press as set forth in claim 6, and a thrust washer between the abutting ends of the shaft sections.

No references cited.